(12) United States Patent
Oh et al.

(10) Patent No.: US 10,665,847 B2
(45) Date of Patent: May 26, 2020

(54) ELECTRODE ASSEMBLY

(71) Applicant: LG CHEM, LTD., Seoul (KR)

(72) Inventors: Jung Shik Oh, Daejeon (KR); Jeong Min Kim, Daejeon (KR); Kyoung Won Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 153 days.

(21) Appl. No.: 15/741,359

(22) PCT Filed: Feb. 20, 2017

(86) PCT No.: PCT/KR2017/001841
§ 371 (c)(1),
(2) Date: Jan. 2, 2018

(87) PCT Pub. No.: WO2017/142381
PCT Pub. Date: Aug. 24, 2017

(65) Prior Publication Data
US 2019/0006655 A1    Jan. 3, 2019

(30) Foreign Application Priority Data

Feb. 19, 2016 (KR) .................. 10-2016-0019834
Feb. 19, 2016 (KR) .................. 10-2016-0019836
Feb. 17, 2017 (KR) .................. 10-2017-0021819

(51) Int. Cl.
*H01M 2/26* (2006.01)
*H01M 2/16* (2006.01)
*H01M 10/04* (2006.01)

(52) U.S. Cl.
CPC ......... *H01M 2/266* (2013.01); *H01M 2/1673* (2013.01); *H01M 10/0413* (2013.01); *H01M 10/0445* (2013.01)

(58) Field of Classification Search
CPC ............ H01M 2/02; H01M 2/16; H01M 2/26
See application file for complete search history.

(56) References Cited

U.S. PATENT DOCUMENTS 8,415,050 B2  4/2013 Lee et al.
9,088,025 B2  7/2015 Lee et al.
(Continued)

FOREIGN PATENT DOCUMENTS

CN    101529613 A    9/2009
CN    104769740 A    7/2015
(Continued)

OTHER PUBLICATIONS

European Search Report for Appl. No. 17753542.4 dated Jun. 4, 2018.
(Continued)

*Primary Examiner* — Kenneth J Douyette
(74) *Attorney, Agent, or Firm* — Birch, Stewart, Kolasch & Birch, LLP

(57) ABSTRACT

The electrode assembly comprises a first electrode unit in which an electrode and a separator are alternately stacked and a second electrode unit in which an electrode and a separator are alternately stacked, the second electrode unit having a size less than that of the first electrode unit and being stacked on the first electrode unit, wherein a tab bonding body manufactured by connecting an electrode tab provided in the first electrode unit to an electrode tab provided in the second electrode unit is disposed within a range of a width of the second electrode unit, and a leading electrode tab to which an electrode lead is connected is disposed on a portion of the first electrode unit.

9 Claims, 17 Drawing Sheets

(56) References Cited

U.S. PATENT DOCUMENTS

| | | |
|---|---|---|
| 10,014,556 B2 | 7/2018 | Kwon et al. |
| 2006/0040176 A1* | 2/2006 | Ling ............... H01M 2/266 429/160 |
| 2010/0047685 A1 | 2/2010 | Lee et al. |
| 2013/0130098 A1 | 5/2013 | Lee et al. |
| 2013/0149569 A1* | 6/2013 | Kim ............... H01M 2/30 429/61 |
| 2013/0171485 A1 | 7/2013 | Kodera et al. |
| 2013/0236768 A1 | 9/2013 | Park et al. |
| 2014/0050958 A1 | 2/2014 | Kwon et al. |
| 2014/0050959 A1 | 2/2014 | Ryu et al. |
| 2014/0072850 A1 | 3/2014 | Kwon et al. |
| 2014/0120394 A1 | 5/2014 | Kwon et al. |
| 2014/0157584 A1 | 6/2014 | Park et al. |
| 2014/0234682 A1 | 8/2014 | Kwon et al. |
| 2014/0255743 A1 | 9/2014 | Kwon et al. |
| 2015/0010799 A1 | 1/2015 | Kwon et al. |
| 2015/0221988 A1 | 8/2015 | Kwon et al. |
| 2015/0333375 A1 | 11/2015 | Kwon et al. |
| 2016/0126597 A1 | 5/2016 | Ryu et al. |

FOREIGN PATENT DOCUMENTS

| | | |
|---|---|---|
| CN | 104798240 A | 7/2015 |
| JP | 2013-140707 A | 7/2013 |
| KR | 2003-0066960 A | 8/2003 |
| KR | 10-2013-0118716 A | 7/2013 |
| KR | 10-2013-0103286 A | 9/2013 |
| KR | 10-2013-0132230 A | 12/2013 |
| KR | 10-2015-0133165 A | 11/2015 |
| KR | 10-2016-0010080 A | 1/2016 |

OTHER PUBLICATIONS

International Search Report issued in PCT/KR2017/001841 (PCT/ISA/210), dated May 31, 2017.

* cited by examiner

ELECTRODE ASSEMBLY

CROSS-REFERENCE TO RELATED APPLICATION

The present application claims the benefit of the priority of Korean Patent Application Nos. 10-2016-0019834, filed on Feb. 19, 2016, 10-2016-0019836, filed on Feb. 19, 2016, and 10-2017-0021819, filed on Feb. 17, 2017, which are hereby incorporated by reference in their entirety.

TECHNICAL FIELD

The present invention relates to an electrode assembly, and more particularly, to an electrode assembly, in which a degree of freedom in design of a secondary battery or a battery pack significantly increases, and a degree of freedom in shape deformation of a free form battery more increases.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, demands for rechargeable batteries as energy source are rapidly increasing.

In such a secondary battery, an electrode assembly may be built in a battery case. The electrode assembly mounted in the battery case is a chargeable and dischargeable power generating device having a structure in which a positive electrode/a separator/a negative electrode are stacked.

In recent years, free form batteries having various shapes are being widely used due to the appearance of various electronic devices. To freely realize shapes of batteries, it may also be necessary to manufacture the electrode assembly provided in the battery into various shapes.

FIG. 1 is a perspective view of an electrode assembly in a state in which electrode tabs are boded to each other to form a tab bonding part in the electrode assembly according to the related art. FIG. 2 is a perspective view illustrating a state in which an electrode lead is connected to the tap bonding part in FIG. 1. FIG. 3 is a plan view of FIG. 2 when viewed from an upper side.

Referring to FIG. 1, an electrode assembly 1 comprising a first electrode unit 10 and a second electrode unit 30 having a size less than that of the first electrode unit 10 and staked on the first electrode unit 10 is illustrated in FIG. 1.

In the electrode assembly 1, positive electrode tabs of the first electrode unit 10 and positive electrode tabs of the second electrode unit 30 are connected to each other to form a positive electrode tab bonding part 51. Also, negative electrode tabs of the first electrode unit 10 and negative electrode tabs of the second electrode unit 30 may also be connected to the other to from a negative electrode tab bonding part 53.

When the positive electrode tab bonding part 51 and the negative electrode tab bonding part 53 are formed, the first electrode unit 10 and the second electrode unit 30 may be electrically connected to each other. Thus, the electrode assembly 1 having large capacity corresponding to the sum of those of the first and second electrode units 10 and 30 may be manufactured.

Referring to FIG. 2, a positive electrode lead 81 and a negative electrode lead 83 may be connected to the electrode assembly 1 to electrically connect the outside of the battery to the electrode assembly 1 within the battery. The positive electrode lead 81 may be connected to the positive electrode tab bonding part 51, and the negative electrode lead 83 may be connected to the negative electrode tab bonding part 53.

Here, positions of the electrode tabs to which the electrode leads 81 and 83 are connected have to be defined within a range J illustrated in FIG. 3.

This is done because, when the electrode tab of the first electrode unit 10 is directly connected to the electrode tab of the second electrode unit 30, the electrode tab of the first electrode unit 10 has to be disposed within the range J of a width of the second electrode unit 30. Thus, all the electrode tab of the first electrode unit 10 and the electrode tab of the second electrode unit 30 have to be disposed within the range J.

As described above, since the range of the position of the electrode tab, at which the electrode lead is capable of being connected to a free form battery, is narrowly limited in the related art, a degree of freedom in design of a secondary battery or a battery pack may be significantly reduced.

DISCLOSURE OF THE INVENTION

Technical Problem

Therefore, the present invention had been made to solve the abovementioned problems, and an object of the present invention is to provide an electrode assembly, in which an electrode tab to which an electrode lead is connected is widened in position range, and thus, a degree of freedom in design of a secondary battery or a battery pack significantly increases, and also, a degree of freedom in shape deformation of a free form battery more increases to more improve the degree of freedom in design of the battery.

Technical Solution

An electrode assembly according to the present invention comprises a first electrode unit in which an electrode and a separator are alternately stacked and a second electrode unit in which an electrode and a separator are alternately stacked, the second electrode unit having a size less than that of the first electrode unit and being stacked on the first electrode unit, wherein a tab bonding body manufactured by connecting an electrode tab provided in the first electrode unit to an electrode tab provided in the second electrode unit is disposed within a range of a width of the second electrode unit, and a leading electrode tab to which an electrode lead is connected is disposed on a portion of the first electrode unit.

Advantageous Effects

The electrode assembly according to the present invention may comprise the first electrode unit and the second electrode unit having the size less than that of the first electrode unit and stacked on the first electrode unit. The tab bonding body in which the electrode tab provided in the first electrode unit and the electrode tab provided in the second electrode unit may be connected to each other may be disposed within the range of the width of the second electrode unit, and the leading electrode tab to which the electrode lead is connected may be disposed on the portion of the first electrode unit. Thus, the position range of the electrode tab to which the electrode lead is connected may be widened, and thus, the degree of freedom in design of the secondary battery or the battery pack may significantly increase. In addition, the degree of freedom in shape defor-

MODE FOR CARRYING OUT THE INVENTION

Preferred embodiments of the present invention will be described below in more detail with reference to the accompanying drawings. However, the present invention is not limited to the embodiments below.

Embodiment 1

Figure 4:
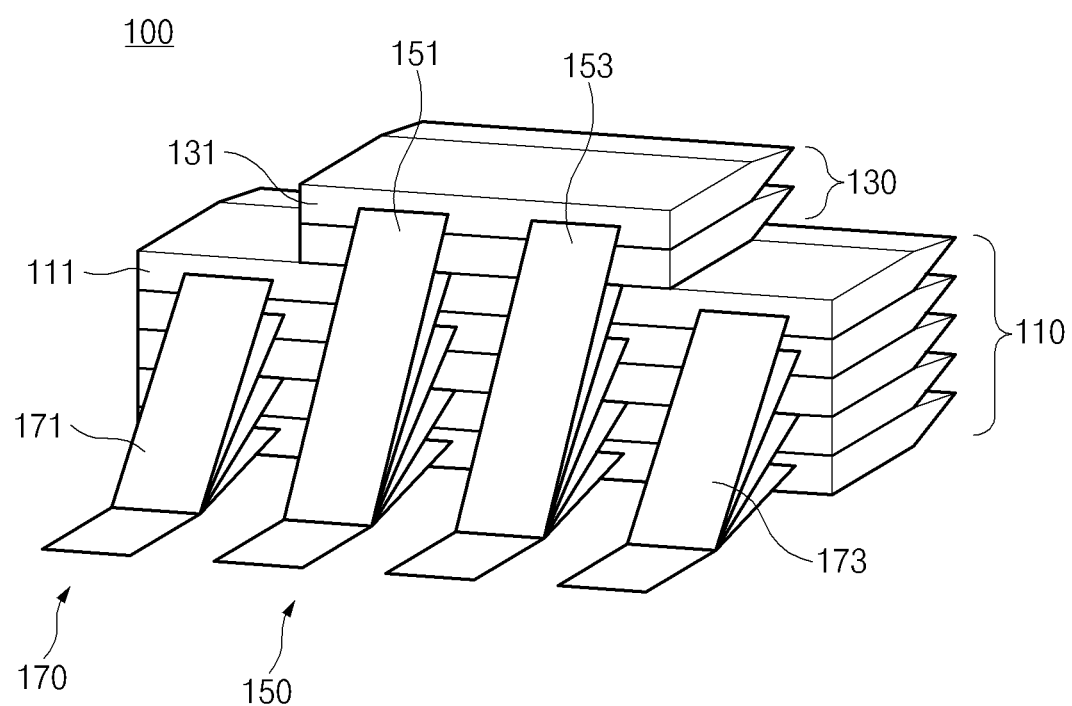
FIG. 4 is a perspective view of an electrode assembly in a state in which electrode tabs are bonded to each other to from a tab bonding body in an electrode assembly according to Embodiment 1 of the present invention.
Figure 5:
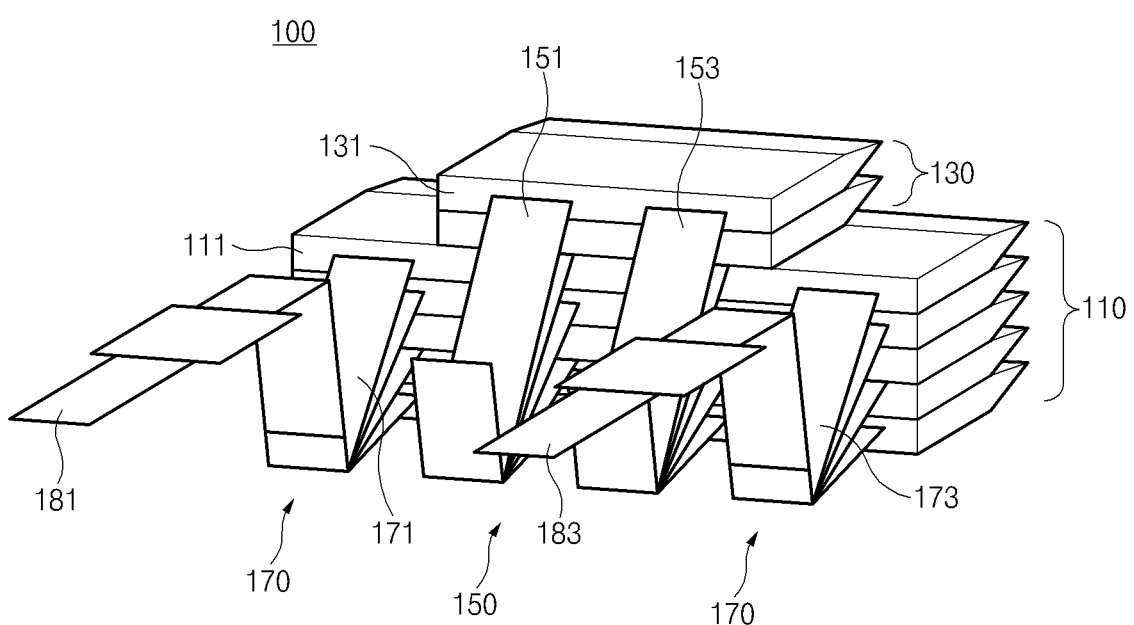
FIG. 5 is a perspective view illustrating a state in which an electrode lead is connected to a leading electrode tab in the electrode assembly according to Embodiment 1 of the present invention.
Figure 6:
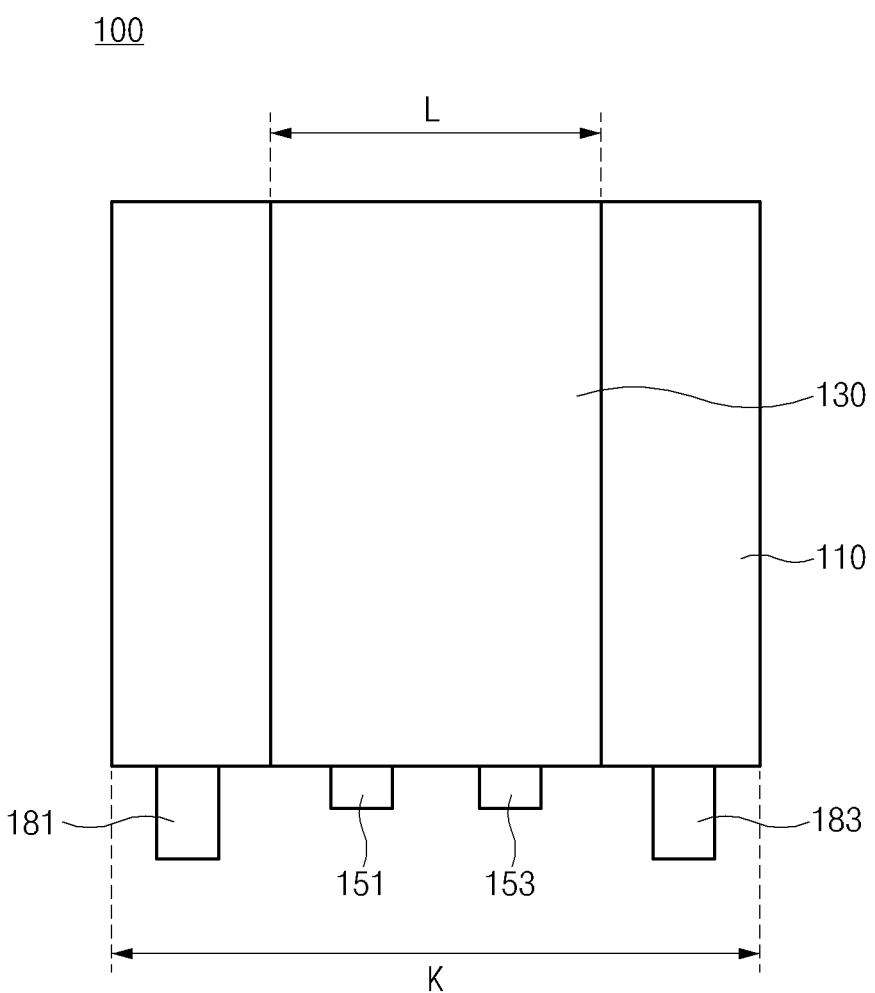
FIG. 6 is a plan view of the electrode assembly of FIG. 5 when viewed from an upper side.

FIG. 4 is a perspective view of an electrode assembly in a state in which electrode tabs are bonded to each other to from a tab bonding body in an electrode assembly according to Embodiment 1 of the present invention. FIG. 5 is a perspective view illustrating a state in which an electrode lead is connected to a leading electrode tab in the electrode assembly according to Embodiment 1 of the present invention. FIG. 6 is a plan view of the electrode assembly of FIG. 5 when viewed from an upper side.

Hereinafter, an electrode assembly according to Embodiment 1 of the present invention will be described with reference to FIGS. 4 to 6.

Referring to FIG. 4, an electrode assembly 100 according to Embodiment 1 of the present invention comprises a first electrode unit 110 and a second electrode unit 130 stacked on the first electrode unit 110.

The first electrode unit 110 may be formed by alternately stacking an electrode and a separator. Particularly, the first electrode unit 110 may be a unit in which a plurality of first unit cells 111, each of which is a radical unit in which the electrode and the separator are alternately stacked to be bonded to each other, are stacked.

That is, after the first unit cells 111, in which the electrode and the separator are alternately stacked to be bonded to each other by heat and a pressure, is formed, a plurality of first unit cells 111 are stacked to form the first electrode unit 110. Here, the first unit cell 111 may be a bonding body in which the electrode and the separator are alternately staked and laminated to be bonded to each other.

The second electrode unit 130 may be formed in the same manner as the first electrode unit 110.

The second electrode unit 130 may be formed by alternately stacking the electrode and the separator. Particularly, the second electrode unit 130 may be formed by stacking a plurality of second unit cells 131, each of which is a unit in which the electrode and the separator are alternately stacked and bonded to each other.

That is, after the second unit cells 131, in which the electrode and the separator are alternately stacked to be bonded to each other by heat and a pressure, is formed, a plurality of second unit cells 131 are stacked to form the second electrode unit 130. Here, the second unit cell 131 may be a bonding body in which the electrode and the separator are alternately staked and laminated to be bonded to each other.

The second electrode unit 130 stacked on the first electrode unit 110 may have a size less than that of the first electrode unit 110. Particularly, the second electrode unit 130 may have a width L less than that K of the first electrode unit 110 (see FIG. 6).

In the electrode assembly 100 according to Embodiment 1 of the present invention, an electrode tab of an electrode provided in the first electrode unit 110 and an electrode tab of an electrode provided in the second electrode unit 130 may be connected to each other to form a tab bonding body 150.

The tab bonding body 150 may comprise a positive electrode tab bonding body 151 and a negative electrode tab bonding body 153. The positive electrode tab bonding body 151 may be formed by connecting a positive electrode tab provided in the first electrode unit 110 to a positive electrode tab provided in the second electrode unit 130. The negative electrode tab bonding body 153 may be formed by bonding and connecting a negative electrode tab provided in the first electrode unit 110 to a negative electrode tab provided in the second electrode unit 130.

When the tab bonding body 150 is formed as described above, the first electrode unit 110 and the second electrode unit 130 may be electrically connected to each other. Thus, the electrode assembly 100 having large capacity corresponding to the sum of those of the first and second electrode units 110 and 130 may be manufactured.

However, the tab bonding body 150 may be disposed within a range L of the width of the second electrode unit 130. This is done because, when the electrode tab of the first electrode unit 110 is directly connected to the electrode tab of the second electrode unit 130, the electrode tab of the first electrode unit 110 has to be disposed within the range of the width of the second electrode unit 130.

Also, in the electrode assembly 100 according to Embodiment 1 of the present invention, a leading electrode tab 170 is disposed on a portion of the first electrode unit 110. The leading electrode tab 170 may be an electrode tab to which an electrode lead is connected so as to electrically connect a device outside the battery to the electrode assembly 100 inside the battery (see FIG. 4). In the electrode assembly 100 according to Embodiment 1 of the present invention, the tab bonding body 150 and the leading electrode tab 170 may be directed in the same direction.

The leading electrode tab 170 may comprises a leading positive electrode tab 171 to which a positive electrode lead 181 is connected and a leading negative electrode tab 173 to which a negative electrode lead 183 is connected (see FIGS. 4 and 5).

The leading electrode tab 170 may be freely connected to any portion of the first electrode unit 110. The leading electrode tab 170 may be connected to a portion or the whole of the first electrode unit 110.

However, there are advantages depending on the form or state of the leading electrode tab 170 being connected.

In the electrode assembly 100 according to Embodiment 1 of the present invention, the leading electrode tab 170 may be disposed on a portion of the first electrode unit 110, at which the first electrode unit 110 and the second electrode unit 130 do not overlap each other.

As illustrated in FIG. 5, the leading electrode tab 170 may be disposed outside both sides of the tab bonding body 150. That is, in FIG. 5, the leading positive electrode tab 171 may be disposed outside a right side of the positive electrode tab bonding body 151, and the leading negative electrode tab 173 may be disposed outside a right side of the negative electrode tab bonding body 153. Also, the leading electrode tab 170 may be an electrode tab that does not belong to the second electrode unit 130, but belong to only the first electrode unit 110.

In this case, interference between the leading electrode tab 170 and the tab bonding body 150 may be prevented.

In the electrode assembly 100 according to Embodiment 1 of the present invention, although the electrode leads 181 and 183 are connected to only the leading electrode tab 170, since an intermediate tab bonding body 150 is electrically connected to the whole of the electrode assembly 100, the same effect as that the electrode leads 181 and 183 are connected to the whole of the electrode assembly 100 may be obtained.

Figure 1:
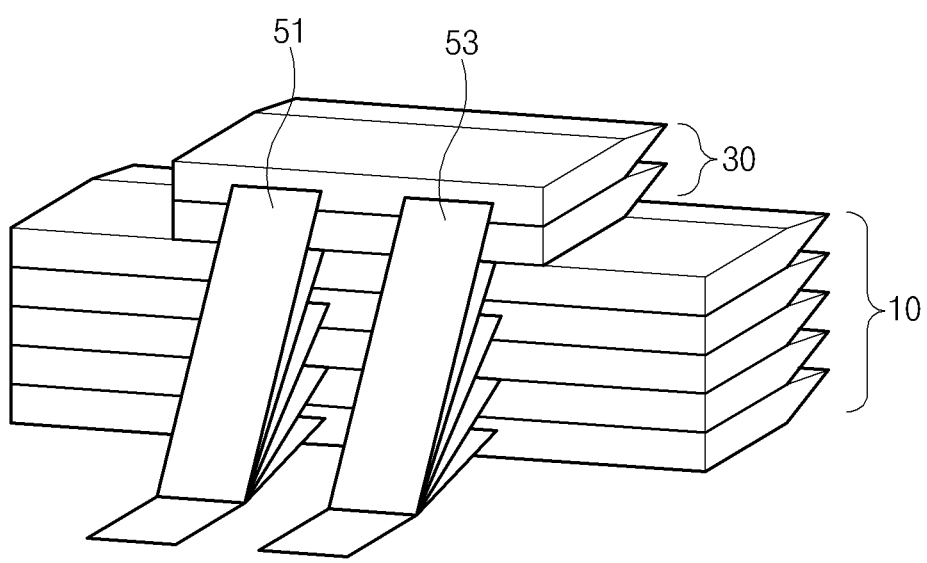
FIG. 1 is a perspective view of an electrode assembly in a state in which electrode tabs are boded to each other to form a tab bonding part in the electrode assembly according to a related art.
Figure 2:
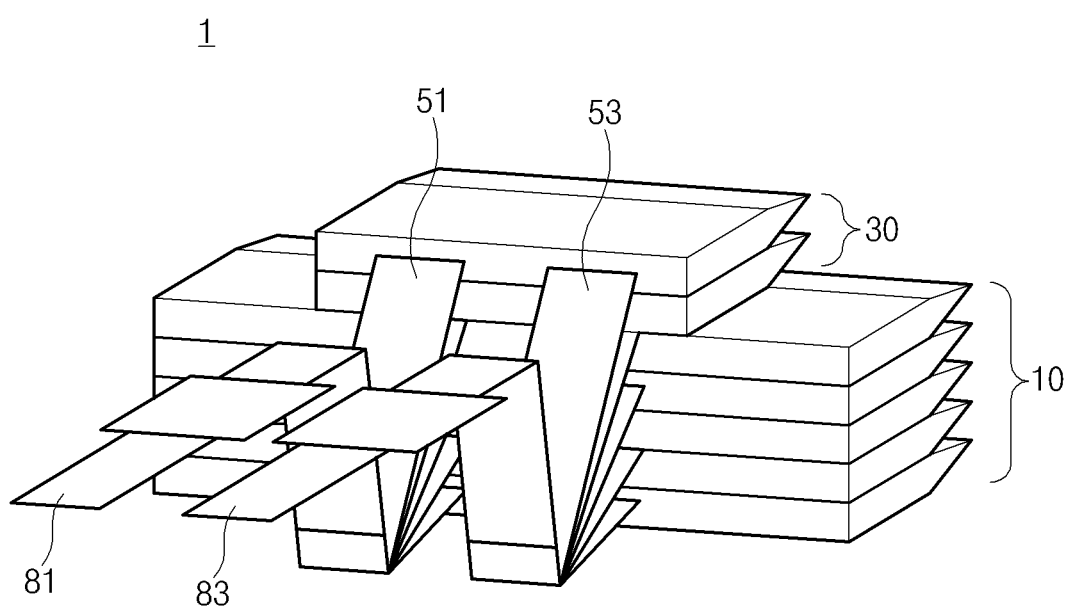
FIG. 2 is a perspective view illustrating a state in which an electrode lead is connected to the tap bonding part in FIG. 1.
Figure 3:
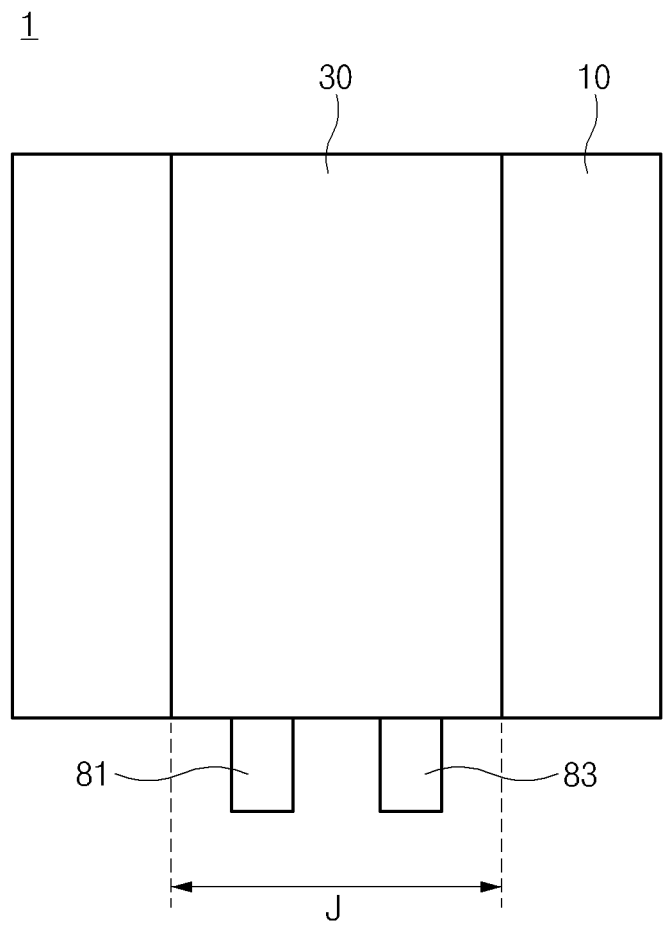
FIG. 3 is a plan view of the electrode assembly of FIG. 2 when viewed from an upper side.

In the electrode assembly 100 constituted as described above according to Embodiment 1 of the present invention, the position range of the electrode tab, to which the electrode lead is connected, may be expanded up to a range K of the width of the first electrode assembly 100, unlike the related art, (see FIG. 6). This is in contrast to the related art in which the position range of the electrode tab to which the electrode lead is connected is limited to the range J (see FIG. 3).

Therefore, in the electrode assembly according to Embodiment 1 of the present invention, the position range of the electrode tab, to which the electrode lead is connected, may be widened, and thus, a degree of freedom in design of the secondary battery or the battery pack may significantly increase.

Embodiment 2

Figure 7:
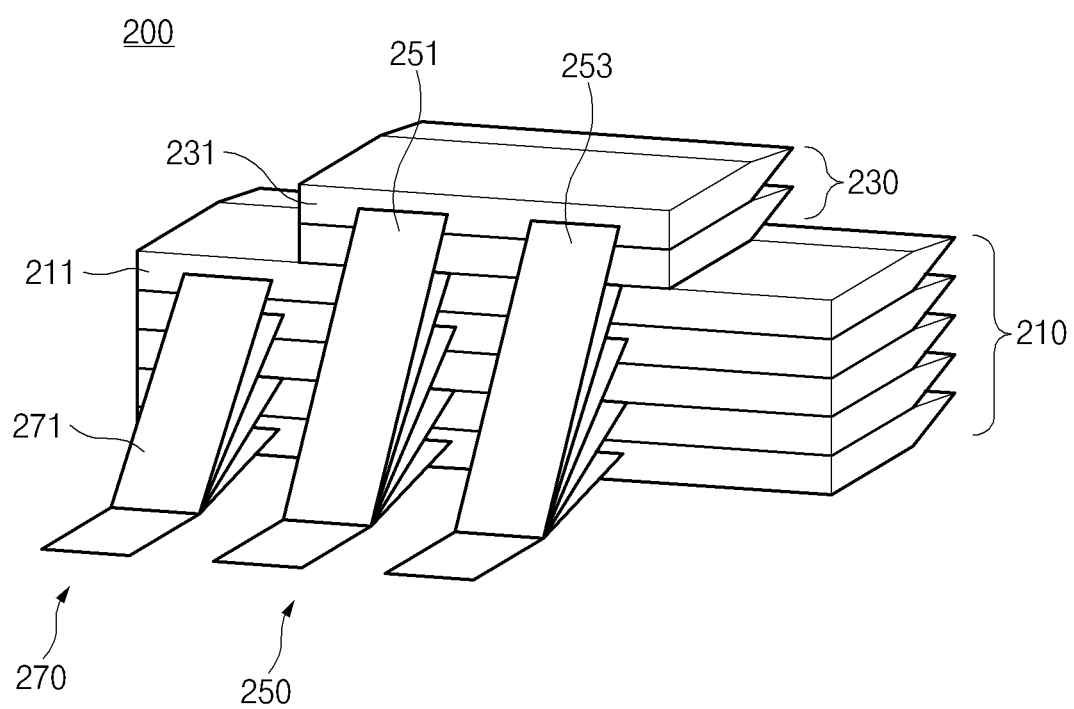
FIG. 7 is a perspective view of an electrode assembly in a state in which electrode tabs are bonded to each other to from a tab bonding body in an electrode assembly according to Embodiment 2 of the present invention.
Figure 8:
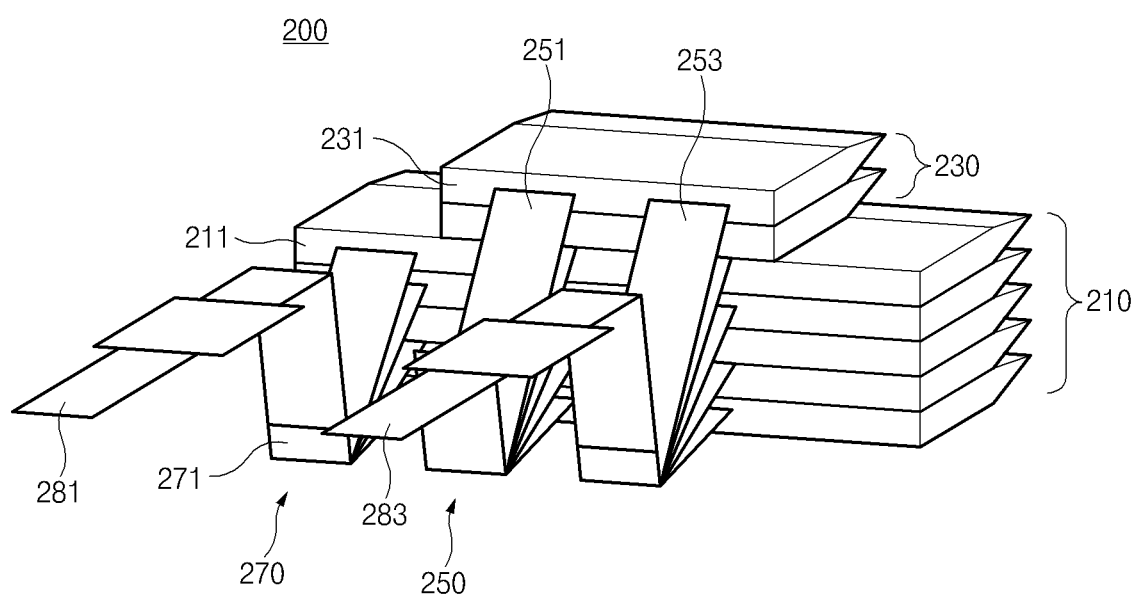
FIG. 8 is a perspective view illustrating a state in which an electrode lead is connected to an electrode tab in the electrode assembly according to Embodiment 2 of the present invention.
Figure 9:
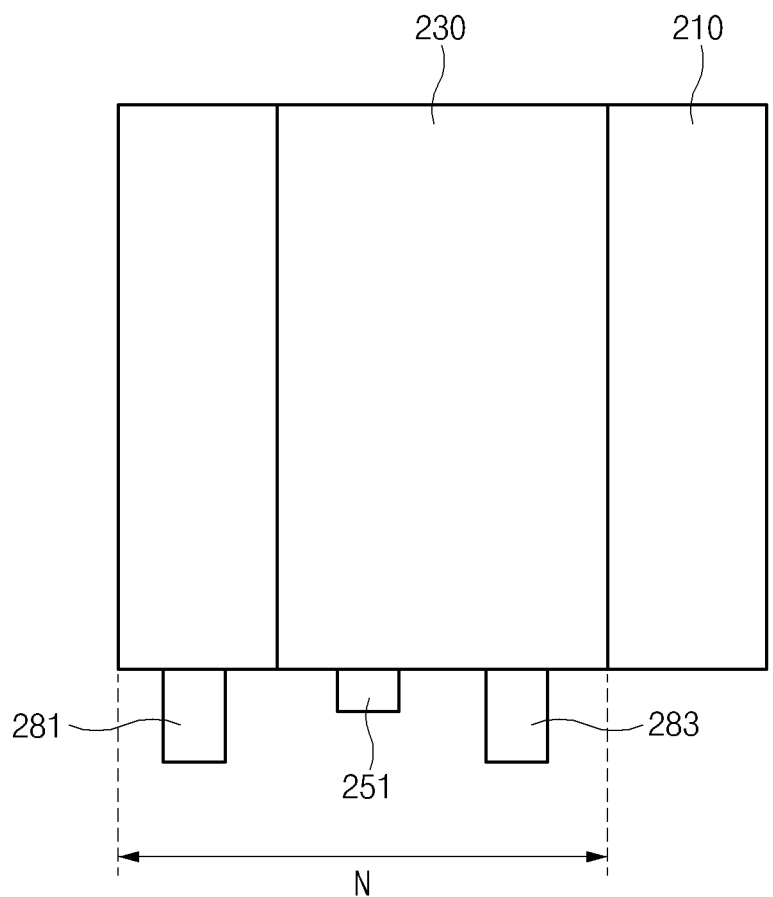
FIG. 9 is a plan view of the electrode assembly of FIG. 8 when viewed from an upper side.

FIG. 7 is a perspective view of an electrode assembly in a state in which electrode tabs are bonded to each other to from a tab bonding body in an electrode assembly according to Embodiment 2 of the present invention. FIG. 8 is a perspective view illustrating a state in which an electrode lead is connected to an electrode tab in the electrode assembly according to Embodiment 2 of the present invention. FIG. 9 is a plan view of the electrode assembly of FIG. 8 when viewed from an upper side.

The electrode assembly according to Embodiment 2 of the present invention has constituents similar to those of the electrode assembly according to Embodiment 1 of the present invention. However, the electrode assembly according to Embodiment 2 is different from that according to Embodiment 1 in that a negative electrode lead is connected to a negative electrode bonding body.

For reference, the same (equivalent) component as that according to the foregoing embodiment is given by the same (equivalent) reference symbol, and thus, their detailed description will be omitted.

Hereinafter, an electrode assembly according to Embodiment 2 of the present invention will be described with reference to FIGS. 7 to 9.

In an electrode assembly 200 according to Embodiment 2 of the present invention, an electrode tab of an electrode provided in the first electrode unit 210 and an electrode tab of an electrode provided in the second electrode unit 230 may be connected to each other to form a tab bonding body 250, like the electrode assembly 100 according to Embodiment 1.

The tab bonding body 250 may comprise a positive electrode tab bonding body 251 and a negative electrode tab bonding body 253. The positive electrode tab bonding body 251 may be formed by connecting a positive electrode tab provided in the first electrode unit 210 to a positive electrode tab provided in the second electrode unit 230. The negative electrode tab bonding body 253 may be formed by bonding and connecting a negative electrode tab provided in the first electrode unit 210 to a negative electrode tab provided in the second electrode unit 230.

However, in the electrode assembly 200 according to Embodiment 2 of the present invention, a negative electrode lead 283 may be directly connected to the negative electrode tab bonding body 253 (see FIG. 8). Although the negative electrode lead 183 is connected to the leading negative electrode tab 173 in the above-described Embodiment 1, a negative electrode lead 283 is connected to the tab bonding body 250, particularly, the negative electrode tab bonding body 253 in Embodiment 2. Thus, in Embodiment 2, a leading negative electrode tab may be unnecessary.

Also, in the electrode assembly 200 according to Embodiment 2 of the present invention, a leading electrode tab 270 comprises a leading positive electrode tab 271 to which a positive electrode lead 281 is connected. Here, the leading positive electrode tab 271 may be disposed on a portion of a left side of the first electrode unit 210, at which the first electrode unit 210 and the second electrode unit 230 do not overlap each other (in FIG. 8).

When provided with the above-described constituents, a position of the electrode tab to which the electrode lead is connected may be defined within a range N in the electrode assembly 200 according to Embodiment 2 of the present invention (see FIG. 9).

As described above, in the electrode assembly 200 according to Embodiment 2 of the present invention, the position range of the electrode tab to which the electrode lead is connected may be defined within a new range, and thus, the degree of freedom in design of the secondary battery and the battery pack may increase in a new form.

Embodiment 3

Figure 10:
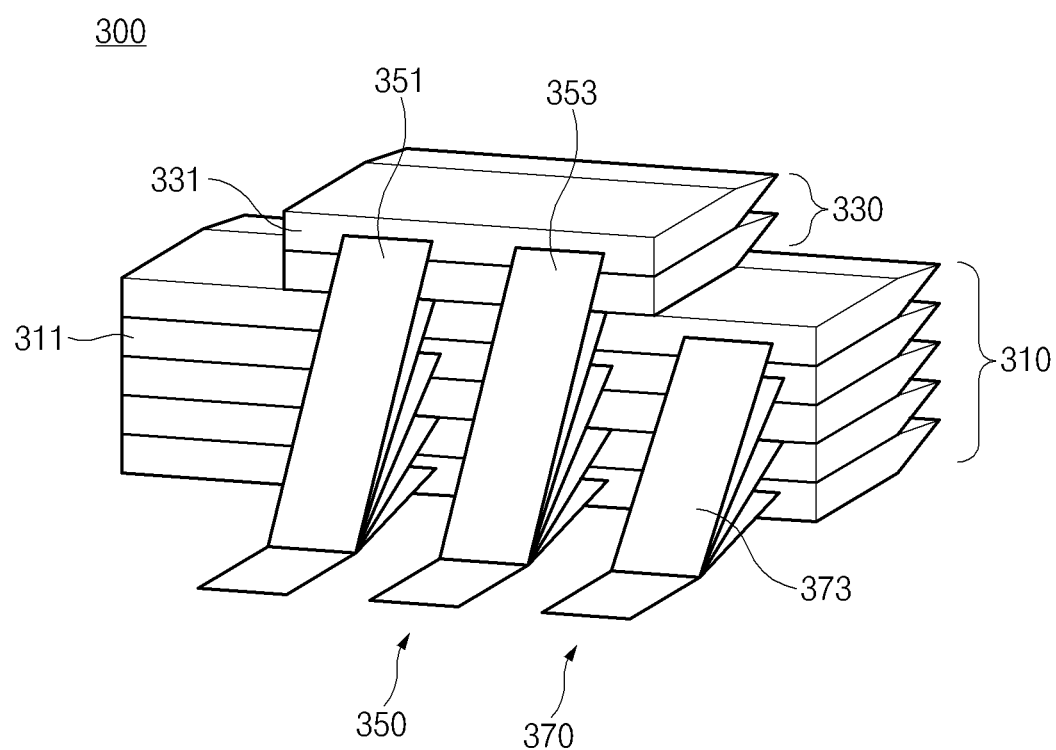
FIG. 10 is a perspective view of an electrode assembly in a state in which electrode tabs are bonded to each other to from a tab bonding body in an electrode assembly according to Embodiment 3 of the present invention.
Figure 11:
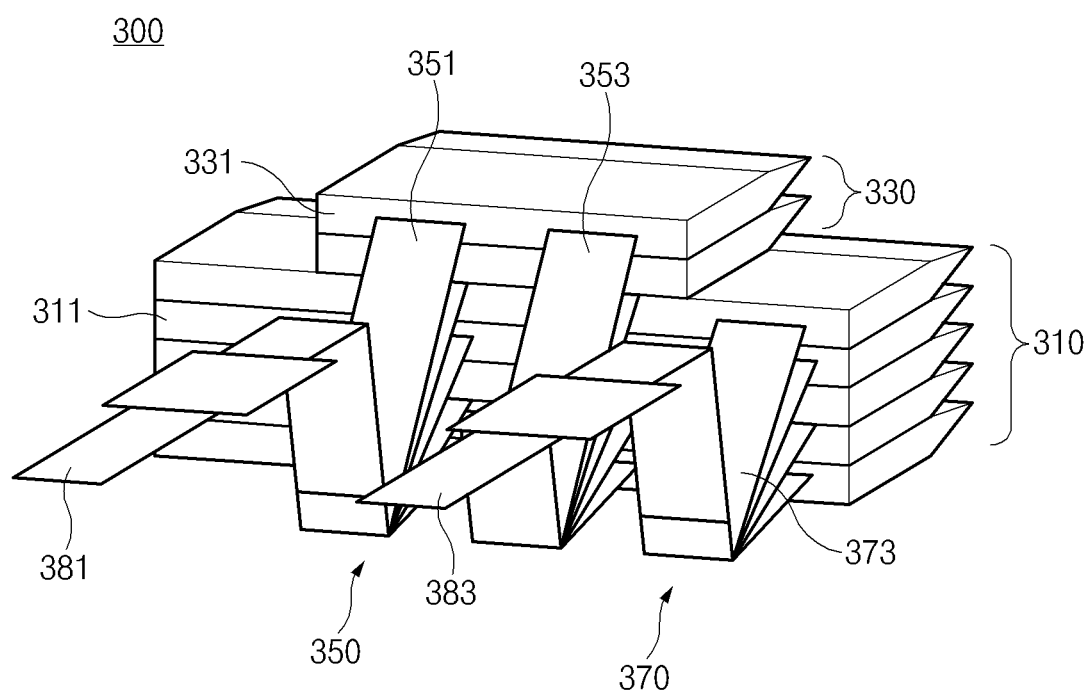
FIG. 11 is a perspective view illustrating a state in which an electrode lead is connected to an electrode tab in the electrode assembly according to Embodiment 3 of the present invention.
Figure 12:
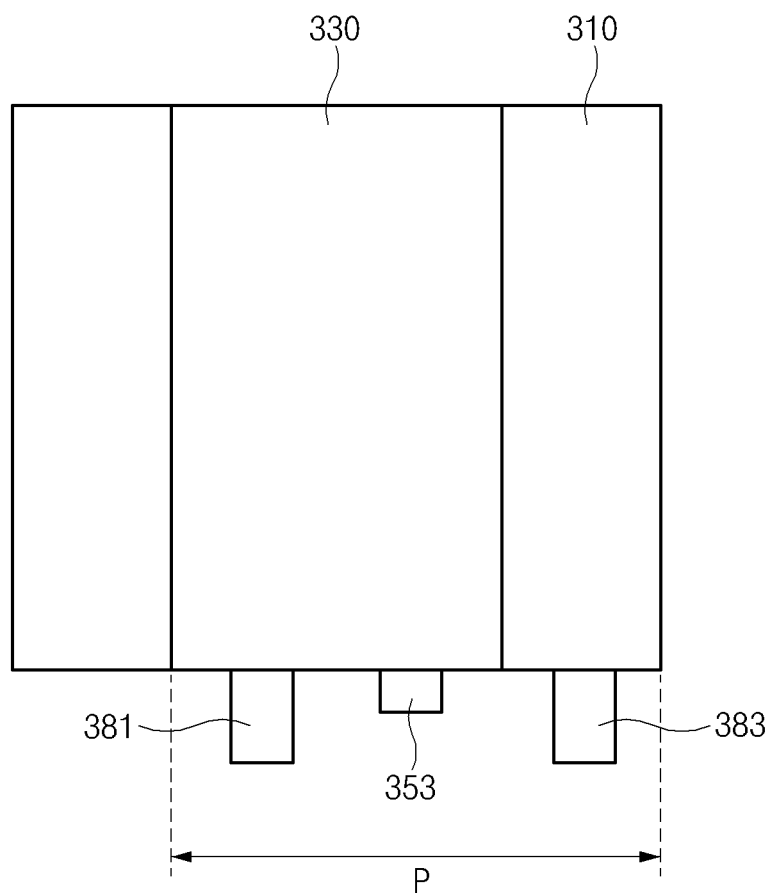
FIG. 12 is a plan view of the electrode assembly of FIG. 11 when viewed from an upper side.

FIG. 10 is a perspective view of an electrode assembly in a state in which electrode tabs are bonded to each other to from a tab bonding body in an electrode assembly according to Embodiment 3 of the present invention. FIG. 11 is a perspective view illustrating a state in which an electrode lead is connected to an electrode tab in the electrode assembly according to Embodiment 3 of the present invention. FIG. 12 is a plan view of the electrode assembly of FIG. 11 when viewed from an upper side.

The electrode assembly according to Embodiment 3 of the present invention has constituents similar to those of the electrode assembly according to Embodiment 1 of the present invention. However, the electrode assembly according to Embodiment 2 is different from that according to Embodiment 1 in that a positive electrode lead is connected to a positive electrode bonding body.

For reference, the same (equivalent) component as that according to the foregoing embodiment is given by the same (equivalent) reference symbol, and thus, their detailed description will be omitted.

Hereinafter, an electrode assembly according to Embodiment 3 of the present invention will be described with reference to FIGS. 10 to 12.

In an electrode assembly 300 according to Embodiment 3 of the present invention, an electrode tab of an electrode provided in the first electrode unit 310 and an electrode tab of an electrode provided in the second electrode unit 330 may be connected to each other to form a tab bonding body 350, like the electrode assembly 100 according to Embodiment 1.

The tab bonding body 350 may comprise a positive electrode tab bonding body 351 and a negative electrode tab bonding body 353. The positive electrode tab bonding body 351 may be formed by connecting a positive electrode tab provided in the first electrode unit 310 to a positive electrode tab provided in the second electrode unit 330. The negative electrode tab bonding body 353 may be formed by bonding and connecting a negative electrode tab provided in the first electrode unit 310 to a negative electrode tab provided in the second electrode unit 330.

However, in the electrode assembly 300 according to Embodiment 3 of the present invention, a positive electrode lead 381 may be directly connected to the positive electrode tab bonding body 351 (see FIG. 11). Although the positive electrode lead 181 is connected to the leading positive electrode tab 171 in the above-described Embodiment 1, a positive electrode lead 381 is connected to the tab bonding body 350, particularly, the positive electrode tab bonding body 351 in Embodiment 3. Thus, in Embodiment 3, a leading positive electrode tab may be unnecessary.

Also, in the electrode assembly 300 according to Embodiment 3 of the present invention, a leading electrode tab 370 comprises a leading negative electrode tab 373 to which a negative electrode lead 383 is connected. Here, the leading negative electrode tab 373 may be disposed on a portion of a right side of the first electrode unit 310, at which the first electrode unit 310 and the second electrode unit 330 do not overlap each other (in FIG. 11).

When provided with the above-described constituents, a position of the electrode tab to which the electrode lead is connected may be defined within a range P in the electrode assembly 300 according to Embodiment 3 of the present invention (see FIG. 12).

As described above, in the electrode assembly 300 according to Embodiment 3 of the present invention, the position range of the electrode tab to which the electrode lead is connected may be defined within a new range, and thus, the degree of freedom in design of the secondary battery and the battery pack may increase in a new form.

Embodiment 4

Figure 13:
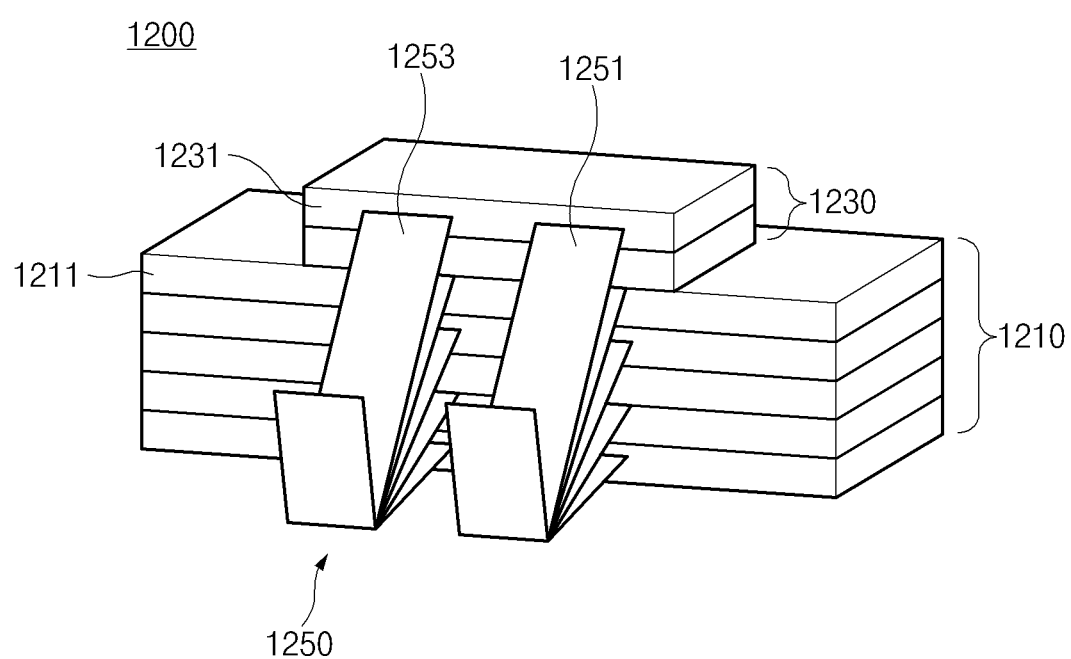
FIG. 13 is a perspective view of an electrode assembly in a state in which electrode tabs are bonded to each other to from a tab bonding body in an electrode assembly according to Embodiment 4 of the present invention.
Figure 14:
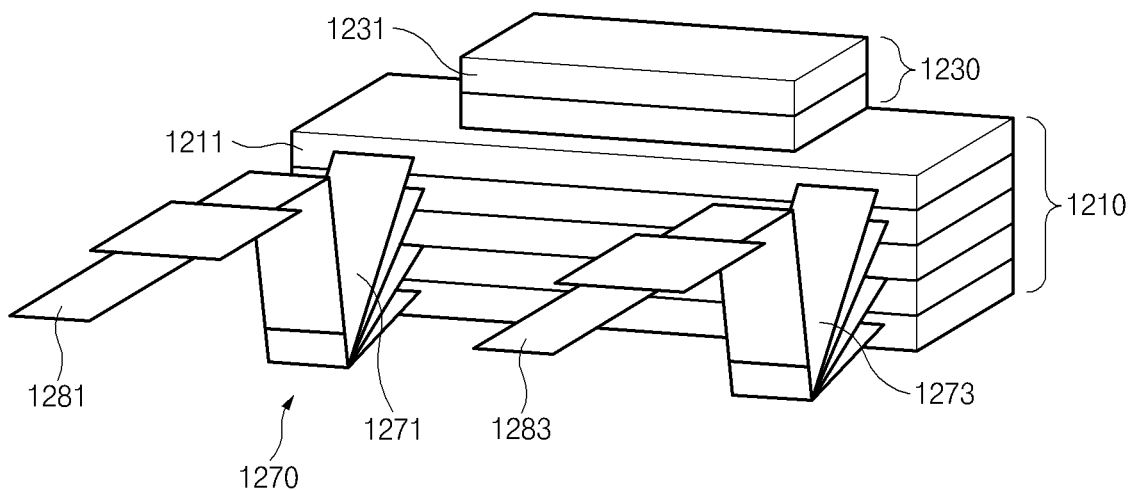
FIG. 14 is a perspective view illustrating a state in which an electrode lead is connected to a leading electrode tab in the electrode assembly when viewed from an opposite side of FIG. 13 according to Embodiment 4 of the present invention.
Figure 15:
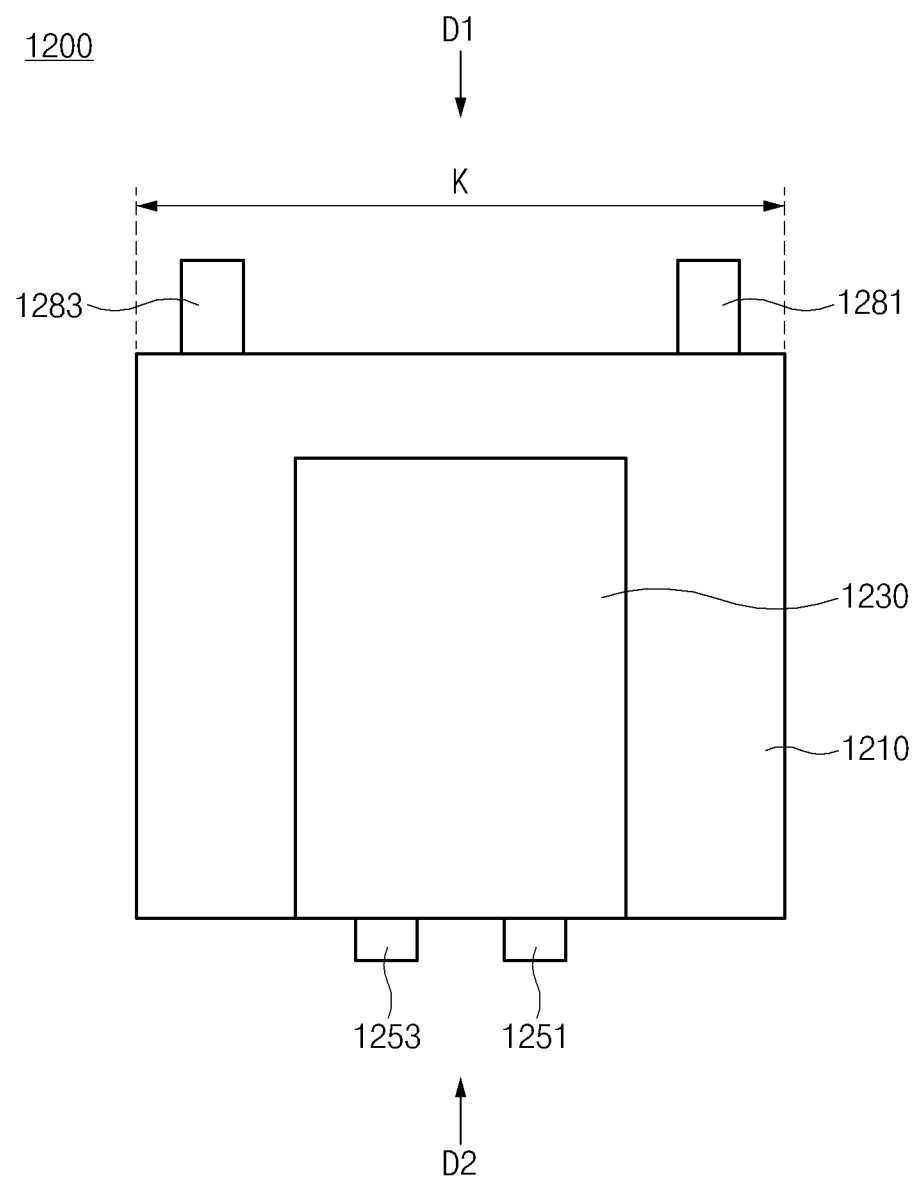
FIG. 15 is a plan view of the electrode assembly of FIG. 14 when viewed from an upper side.
Figure 16:
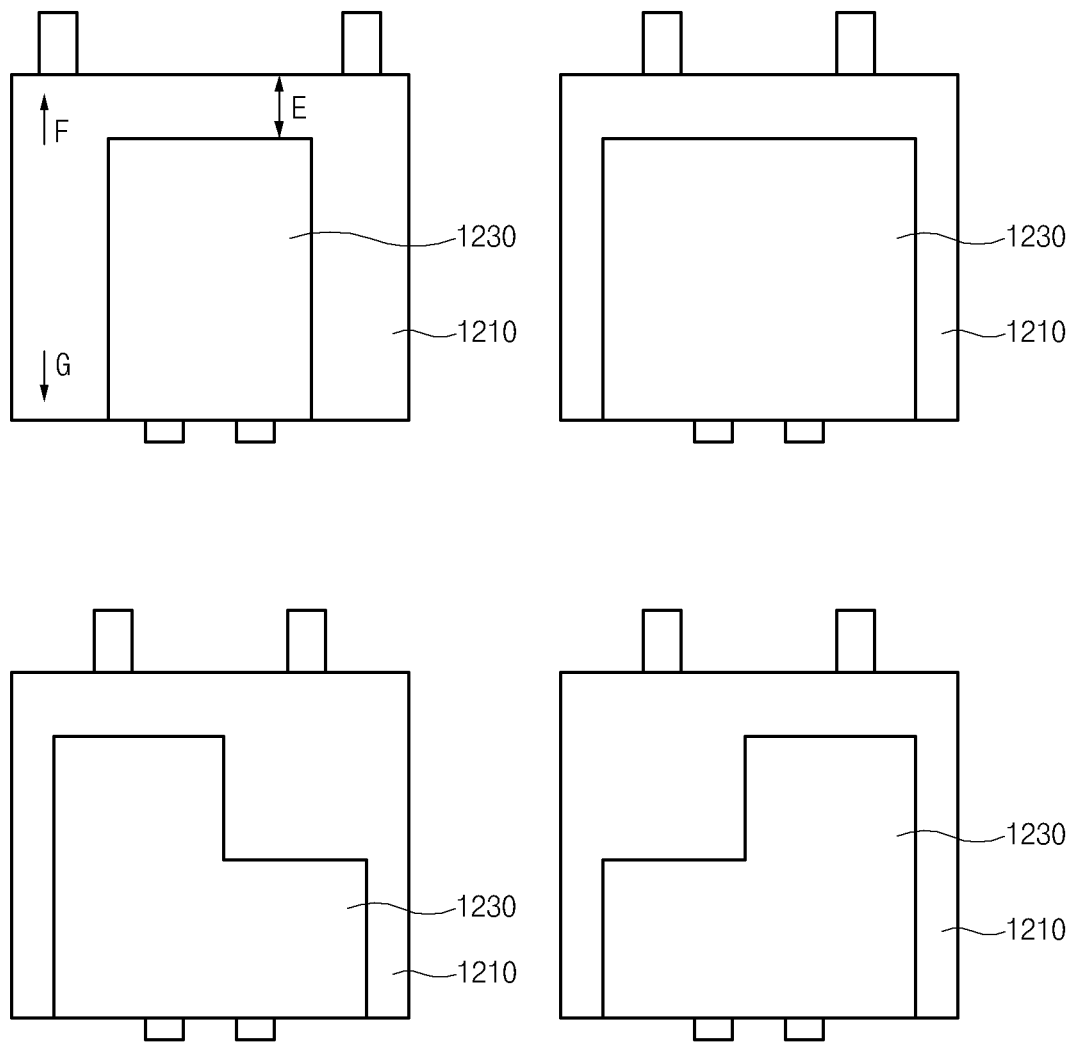
FIGS. 16 and 17 are plan views illustrating a state in which a second electrode unit is deformed in various shapes in the electrode assembly according to Embodiment 4 of the present invention.
Figure 17:
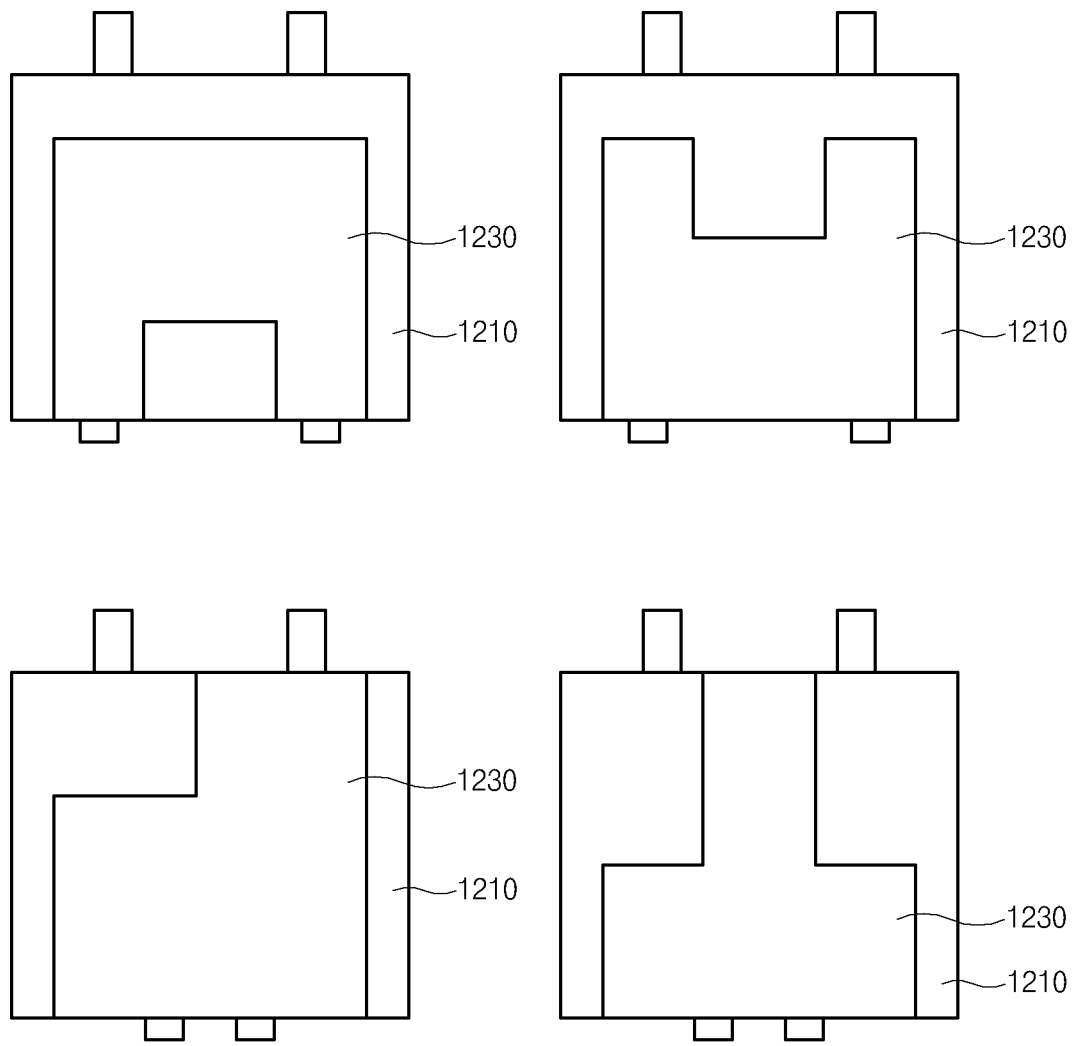

FIG. 13 is a perspective view of an electrode assembly in a state in which electrode tabs are bonded to each other to from a tab bonding body in an electrode assembly according to Embodiment 4 of the present invention. FIG. 14 is a perspective view illustrating a state in which an electrode lead is connected to a leading electrode tab in the electrode assembly when viewed from an opposite side of FIG. 13 according to Embodiment 4 of the present invention. FIG. 15 is a plan view of the electrode assembly of FIG. 14 when viewed from an upper side. FIGS. 16 and 17 are plan views illustrating a state in which a second electrode unit is deformed in various shapes in the electrode assembly according to Embodiment 4 of the present invention.

The electrode assembly according to Embodiment 4 of the present invention has constituents similar to those of the electrode assembly according to Embodiment 1 of the present invention. However, the electrode assembly according to Embodiment 4 is different from that according to Embodiment 1 in that a tab bonding body and a leading electrode tab are directed in directions different from each other.

For reference, the same (equivalent) component as that according to the foregoing embodiment is given by the same (equivalent) reference symbol, and thus, their detailed description will be omitted.

Hereinafter, an electrode assembly according to Embodiment 4 of the present invention will be described with reference to FIGS. 13 to 17.

Referring to FIGS. 13 and 15, in an electrode assembly 1200 according to Embodiment 4 of the present invention, an electrode tab of an electrode provided in the first electrode unit 1210 and an electrode tab of an electrode provided in the second electrode unit 1230 may be connected to each other to form a tab bonding body 1250, like the electrode assembly 100 according to Embodiment 1. For reference, FIG. 13 is a perspective view when the electrode assembly 1200 is viewed in a direction D2 of FIG. 15.

The tab bonding body 1250 may comprise a positive electrode tab bonding body 1251 and a negative electrode tab bonding body 1253. The positive electrode tab bonding body 1251 may be formed by connecting a positive electrode tab provided in the first electrode unit 1210 to a positive electrode tab provided in the second electrode unit 1230. The negative electrode tab bonding body 1253 may be formed by bonding and connecting a negative electrode tab provided in the first electrode unit 1210 to a negative electrode tab provided in the second electrode unit 1230.

Also, in the electrode assembly 1200 according to Embodiment 4 of the present invention, a leading electrode tab 1270 is disposed on a portion of the first electrode unit 1210 in a direction opposite to that in which the tab bonding body 1250 is directed. The leading electrode tab 1270 may be an electrode tab to which electrode leads 1281 and 1283 are connected so as to electrically connect a device outside the battery to the electrode assembly 1200 inside the battery (see FIGS. 14 and 15).

In the electrode assembly 1200 according to Embodiment 4 of the present invention, the tab bonding body 1250 and the leading electrode tab 1270 may be directed in directions different from each other. For reference, FIG. 14 is a perspective view when the electrode assembly 1200 is viewed in a direction D1 of FIG. 15.

The leading electrode tab 1270 may comprises a leading positive electrode tab 1271 to which a positive electrode lead 1281 is connected and a leading negative electrode tab 1273 to which a negative electrode lead 1283 is connected (see FIG. 14).

The leading electrode tab 1270 may be freely disposed within a range K of a width of the first electrode unit 1210 (see FIGS. 14 and 15). Also, the leading electrode tab 1270 may be electrode tabs that do not belong to the second electrode unit 1230, but belong to only the first electrode unit 1210 (see FIG. 14).

Particularly, since the tab boding body 1250 and the leading electrode tab 1270 are directed in direction opposite to each other, there is no possibility of causing positional interface therebetween. Thus, the position of the leading electrode tab 1270 may freely move within the range K. This means that the degree of freedom in design significantly increases.

Referring to FIGS. 16 and 17, in Embodiment 1, the second electrode unit 1230 has to be closely attached in a direction F so that a distance E becomes zero. However, in Embodiment 4, the second electrode unit 1230 may be closely attached in a direction G. This is a phenomenon that occurs because the tab bonding body 1250 and the leading electrode tab 1270 are directed in directions opposite to each other.

When the second electrode unit 1230 is variously changed in shape in the state in which the second electrode unit 1230 is closely attached in the direction G, this means that the degree of freedom in shape deformation of the free form battery more increases. FIGS. 16 and 17 illustrate examples of the second electrode unit 1230 having various shapes.

Therefore, in the electrode assembly according to Embodiment 4 of the present invention, the position range of the electrode tab to which the electrode lead is connected may be widened, and thus, the degree of freedom in design of the secondary battery or the battery pack may significantly increase. In addition, the degree of freedom in shape deformation of the free form battery may more increase to more improve the degree of freedom in design of the battery.

While the embodiments of the present invention have been described with reference to the specific embodiments, it will be apparent to those skilled in the art that various changes and modifications may be made without departing from the spirit and scope of the invention as defined in the following claims.

The invention claimed is:

1. An electrode assembly comprising:
    a first electrode unit in which an electrode and a separator are alternately stacked; and
    a second electrode unit in which an electrode and a separator are alternately stacked, the second electrode unit having a size less than that of the first electrode unit and being stacked on the first electrode unit,
    wherein a tab bonding body manufactured by connecting an electrode tab provided in the first electrode unit to an electrode tab provided in the second electrode unit is disposed within a range of a width of the second electrode unit, and
    a leading electrode tab to which an electrode lead is connected is disposed on a portion of the first electrode unit,
    wherein the leading electrode tab is disposed on a portion of the first electrode unit, at which the first electrode unit and the second electrode unit do not overlap each other.

2. The electrode assembly of claim 1, wherein the first electrode unit is manufactured by stacking first unit cells, each of which is a unit in which the electrode and the separator are alternately stacked to be bonded to each other.

3. The electrode assembly of claim 1, wherein the second electrode unit is manufactured by stacking second unit cells, each of which is a unit in which the electrode and the separator are alternately stacked to be bonded to each other.

4. The electrode assembly of claim 1, wherein the tab bonding body comprises:
    a positive electrode tab bonding body manufactured by connecting a positive electrode tab provided in the first electrode unit to a positive electrode tab provided in the second electrode unit; and
    a negative electrode tab bonding body manufactured by connecting a negative electrode tab provided in the first electrode unit to a negative electrode tab provided in the second electrode unit,
    wherein the leading electrode tab comprises:
    a leading positive electrode tab to which a positive electrode lead is connected; and
    a leading negative electrode tab to which a negative electrode lead is connected.

5. The electrode assembly of claim 1, wherein the tab bonding body comprises:
    a positive electrode tab bonding body manufactured by connecting a positive electrode tab provided in the first electrode unit to a positive electrode tab provided in the second electrode unit; and
    a negative electrode tab bonding body manufactured by connecting a negative electrode tab provided in the first electrode unit to a negative electrode tab provided in the second electrode unit,
    wherein the leading electrode tab comprises a leading positive electrode tab to which a positive electrode lead is connected.

6. The electrode assembly of claim 1, wherein the tab bonding body comprises:
    a positive electrode tab bonding body manufactured by connecting a positive electrode tab provided in the first electrode unit to a positive electrode tab provided in the second electrode unit; and
    a negative electrode tab bonding body manufactured by connecting a negative electrode tab provided in the first electrode unit to a negative electrode tab provided in the second electrode unit,
    wherein the leading electrode tab comprises a leading negative electrode tab to which a negative electrode lead is connected.

7. The electrode assembly of claim 1, wherein the tab bonding body and the leading electrode tab are directed in directions different from each other.

8. The electrode assembly of claim 1, wherein the tab bonding body and the leading electrode tab are directed in directions opposite to each other.

9. The electrode assembly of claim 1, wherein the tab bonding body comprises:
- a positive electrode tab bonding body manufactured by connecting a positive electrode tab provided in the first electrode unit to a positive electrode tab provided in the second electrode unit; and
- a negative electrode tab bonding body manufactured by connecting a negative electrode tab provided in the first electrode unit to a negative electrode tab provided in the second electrode unit,
- wherein the leading electrode tab comprises one of a leading positive electrode tab to which a positive electrode lead is connected or a leading negative electrode tab to which a negative electrode lead is connected,
- and wherein the leading electrode tab is spaced from and separate from the positive electrode tab bonding body and the negative electrode tab bonding body.

* * * * *